United States Patent
Støy et al.

(10) Patent No.: US 10,702,990 B2
(45) Date of Patent: Jul. 7, 2020

(54) ROBOT AND A METHOD OF CONTROLLING A ROBOT

(71) Applicant: Flow Robotics A/S, Copenhagen NV (DK)

(72) Inventors: Kasper Støy, Copenhagen K (DK); Andrés Faíña Rodríguez-Vila, Copenhagen NV (DK); Farzad Nejatimoharrami, Toronto (CA)

(73) Assignee: Flow Robotics A/S, Copenhagen NV (DK)

( * ) Notice: Subject to any disclaimer, the term of this patent is extended or adjusted under 35 U.S.C. 154(b) by 0 days.

(21) Appl. No.: 16/085,290

(22) PCT Filed: Mar. 17, 2017

(86) PCT No.: PCT/DK2017/050079
§ 371 (c)(1),
(2) Date: Sep. 14, 2018

(87) PCT Pub. No.: WO2017/157402
PCT Pub. Date: Sep. 21, 2017

(65) Prior Publication Data
US 2019/0054624 A1 Feb. 21, 2019

(30) Foreign Application Priority Data

Mar. 17, 2016 (DK) .................. 2016 70155

(51) Int. Cl.
*G06F 19/00* (2018.01)
*B25J 9/16* (2006.01)
(Continued)

(52) U.S. Cl.
CPC ........... *B25J 9/1694* (2013.01); *B25J 9/1679* (2013.01); *B25J 13/06* (2013.01); *B25J 13/081* (2013.01);
(Continued)

(58) Field of Classification Search
CPC .... B25J 9/1694; B25J 15/0616; B25J 13/081; B25J 13/06; B25J 9/1679; G05B 19/4155;
(Continued)

(56) References Cited

U.S. PATENT DOCUMENTS 6,088,628 A 7/2000 Watanabe et al.
6,353,774 B1 3/2002 Goldenberg
(Continued)

FOREIGN PATENT DOCUMENTS

EP 0980523 B1 12/2006
EP 20964443 A2 9/2009
(Continued)

OTHER PUBLICATIONS

Faíña, Andrés. et al., "EvoBot: An Open-Source, Modular Liquid Handling Robot for Nurturing Microbial Fuel Cells" pp. 626-633.
(Continued)

*Primary Examiner* — Ian Jen
(74) *Attorney, Agent, or Firm* — Knobbe Martens Olson & Bear LLP (57) ABSTRACT

The present invention relates to a robot comprising a horizontal or horizontally slanted transparent experiment layer being adapted to support items at arbitrary positions on or in the experiment layer, and a moveable sensor arranged below the transparent experimental layer said sensor being configured for providing a sensor signal indicative of item(s)' location on the experiment layer, an actuator arranged for being moved into different positions above the horizontal transparent layer a display device being configured for visually representing located item(s) a user input device configured for receiving information as to operation of the actuator.

24 Claims, 5 Drawing Sheets

(51) Int. Cl.
*B25J 13/06* (2006.01)
*B25J 13/08* (2006.01)
*B25J 15/06* (2006.01)
*G05B 19/4155* (2006.01)

(52) U.S. Cl.
CPC ...... *B25J 15/0616* (2013.01); *G05B 19/4155* (2013.01); *G05B 2219/39059* (2013.01); *G05B 2219/39396* (2013.01); *G05B 2219/40293* (2013.01); *G05B 2219/45092* (2013.01)

(58) Field of Classification Search
CPC .......... G05B 2219/39059; G05B 2219/45092; G05B 2219/40293; G05B 2219/39396
See application file for complete search history.

(56) References Cited

U.S. PATENT DOCUMENTS

| | | | |
|---|---|---|---|
| 7,585,463 B2 * | 9/2009 | Austin | G01N 35/1011 422/63 |
| 8,840,848 B2 * | 9/2014 | Kraihanzel | G01N 35/1081 422/417 |
| 9,329,194 B2 * | 5/2016 | Fritchie | G01N 35/1065 |
| 2006/0105453 A1 * | 5/2006 | Brenan | B01J 19/0046 435/325 |
| 2009/0080611 A1 | 3/2009 | Ganz | |
| 2011/0039709 A1 | 2/2011 | Lips et al. | |
| 2013/0065797 A1 | 3/2013 | Silbert | |
| 2013/0205920 A1 | 8/2013 | Tow | |
| 2014/0071580 A1 | 3/2014 | Higginson | |

FOREIGN PATENT DOCUMENTS

| | | |
|---|---|---|
| EP | 2745997 A1 | 6/2014 |
| WO | WO 2013/070744 A2 | 5/2013 |
| WO | WO 2014/160903 A2 | 10/2014 |
| WO | WO 2015/051907 A1 | 4/2015 |

OTHER PUBLICATIONS

Faíña, Andrés. et al., "Towards EvoBot: A liquid-handling robot able to automatize and optimize experiments based on real-time feedback" IT University of Copenhagen, Denmark.

Janska, Petra et al. "Collective behaviour in droplet systems" University of Chemistry and Technology Prague / IT University of Copenhagen.

Nejatimoharrami, Farzad et al., "A Low Cost Standalone Open-Source Robotic Platform for Performing Feedback based Liquid Handling Experiments" Robots, Evolution, and Art Lab (REAL), IT University of Copenhagen, Copenhagen, Denmark.

Nejatimoharrami, Farzad et al., "An Open-Source, Low-Cost Robot for Performing Reactive Liquid Handling Experiments" Robots, Evolution, and Art Lab (REAL), IT University of Copenhagen, Copenhagen, Denmark.

Nejatimoharrami, Farzad et al., "Robotic Automation to Augment Quality of Artificial Chemical Life Experiments" pp. 634-635.

Nejatimoharrami, Farzad et al., "UI Design for an Engineering Process: Programming Experiments on a Liquid Handling Robot".

Nejatimoharrami, Farzad et al., "New Capabilities of EvoBot: A Modular, Open-Source Liquid-Handling Robot" SLAS Technology, 2017, pp. 1-7, Society for Laboratory Automation and Screening.

International Search Report for PCT/DK2017/050079 dated Jun. 8, 2017.

* cited by examiner

ROBOT AND A METHOD OF CONTROLLING A ROBOT

CROSS REFERENCE TO RELATED APPLICATIONS

This application is a U.S. National Phase Application of PCT International Application Number PCT/DK2017/050079, filed on Mar. 17, 2017, designating the United States of America and published in the English language, which is an International Application of and claims the benefit of priority to Danish Patent Application No. PA 2016 70155, filed on Mar. 17, 2016. The disclosures of the above-referenced applications are hereby expressly incorporated by reference in their entireties.

FIELD OF THE INVENTION

The present invention relates to a robot comprising a horizontal or horizontally slanted transparent experiment layer being adapted to support items at arbitrary positions on or in the experiment layer, and a moveable sensor arranged below the transparent experimental layer said sensor being configured for providing a sensor signal indicative of item (s)' location on or in the experiment layer, an actuator arranged for being moved into different positions above the horizontal transparent layer a display device being configured for visually representing located item(s) a user input device configured for receiving information as to operation of the actuator.

The invention also relates to a method of controlling such a robot and to the use of such a robot.

BACKGROUND OF THE INVENTION

Robots are known for manipulating contents in e.g. containers see U.S. Pat. No. 6,353,774. Such robots reside in the concept of pre-informing the controller of the robot with a set of instructions to be carried out in order to manipulate the content of containers and the prior knowledge of the location of the containers in the robots. The prior knowledge of the locations of the containers in the robots are defined by trays having a plurality of receptacle for receiving a container, thus a container needs to fit into a receptacle with a fixed location in the tray.

While the robot disclosed in U.S. Pat. No. 6,353,744 is well suited for repeated and automated operations, the robot residence in an automation of repeated operations makes it less versatile to handling e.g. one-of-kind operations.

Hence, an improved robot and use of such a robot would be advantageous.

OBJECT OF THE INVENTION

It is a further object of the present invention to provide an alternative to the prior art.

In particular, it may be seen as an object of the present invention to provide a robot, control of a robot and a use of a robot that solves the above mentioned problems of the prior art.

SUMMARY OF THE INVENTION

Thus, the above described object and several other objects are intended to be obtained in a first aspect of the invention by providing a robot (1) preferably comprising

- a horizontal or horizontally slanted, experiment layer preferably being transparent and preferably being adapted to support items preferably at arbitrary positions on or in the experiment layer;
- a moveable sensor arranged below the transparent experimental layer, said sensor being configured for providing a sensor signal indicative of item(s)' location on the experiment layer;
- an actuator arranged for being moved into different positions above the horizontal transparent layer;
- a display device being configured for visually representing located item(s);
- a user input device.

A robot according to the present invention preferably further comprises a processor configured to

- on the basis of the sensor signal locate an item on the transparent experiment layer;
- display the located item(s) or a graphical presentation thereof on the display device;
- receive a manipulation input through the user input device; and
- in response to said manipulation input, control the actuator to manipulate the content of the displayed item(s).

By horizontal or horizontally slanted transparent experiment layer is preferably meant that the surface of the experiment layer is horizontal or is angled (slanted horizontal experimental layer) with respect to horizontal in an amount less than 45 degrees, such as less than 30 degress, preferably less than 15 degrees, such as less than 5 degrees.

The manipulation may comprise a number of different types of manipulation, such as substance exchange, such as liquid addition and/or removal, movement of one or more item, stacking of the items or the like.

By arranging the sensor below the experimental layer and the actuator above the experimental layer, the present invention provides the advantage that the sensor and actuator can be operated independently of each other, such as being operated in parallel.

This has, inter alia, the effect that the sensor can be used to monitor an experiment carried out on the experiment layer and can thereby signal if something moves, such as moves unintentionally, in the experimental set-up (e.g. by an operator pushes to the robot or the actuator pushes to a container on the experimental layer). Further, mistakes where for instances an operator relocate an item on the experimental layer without informing the robot can be avoided as the sensor may keep track of such movements.

The preferred three layer organization of the present invention may make it possible for the sensor after calibration to instantly detect and calculate the position of an item in the robots frame of reference. Hence, this information may be available to the system without input from the user.

One further advantage of the present invention, is that the actuator may move without obscuring the view of the sensor and hence the sensor always have direct access to monitor the movement and placement of an item(s) and the actuator itself.

In the present context terms are used in a manner being ordinary to skilled person and some of the terms used are detailed below:

Actuator layer is preferably used to mean the space section of a robot being bordered by the extreme positions of one or more actuators of the robot.

Experimental layer is preferably used to mean the space section of a robot defined by the space at which experiments and/or analysis is carried out. Experimental layer may be in the form of or deliminited downwardly by one or more plates, which may be transparent or comprising one or more openings, which may be through going.

Sensor layer is preferably used to mean the space section of a robot below the experiment layer, in which the sensor moves.

Field of view is preferably used to mean that the position within the robot of image obtained by a camera is known.

Support items at arbitrary positions is preferably considered to mean that the position of an item on a surface of the experimental layer or in an opening of the experimental layer is arbitrary in the sense that the processor locates the item on or in the experimental layer, thus, the item does not have to be placed in a predefined position in the robot. The positions at which an item can be positioned may be pre-defined or pre-determined, e.g. by a number opening and/or selected areas. Typically and preferably the upper surface of the experiment layer on which the items repose is an even surface.

Support items (at arbitrary positions) on the experiment layer is preferably used to mean that an item's weight repose on the experiment layer (e.g. on a plate) and that no cavities or openings may be provided in the experiment layer to receive the items; alternatively, openings or cavities may be provided in the experiment layer. In such cases, the experiment layer may preferably be a horizontal or horizontally slanted transparent plate on which the items can be placed.

Support items at arbitrary positions in the experiment layer is preferably used to mean that an item is placed in a cavity or opening in the experiment layer (e.g openings in a plate). In such cases, the experimental layer may be a horizontal or horizontally slanted plate, which comprise one or more openings for receiving item(s) and means of supporting the item's weight in the opening(s).

Adapted to support an item preferably means that the items weight repose either on a plate or in an opening in a plate, on or in the experiment layer respectively.

Transparent is preferably used to mean that e.g. the experiment layer is a plate made from a transparent material such glass, plastic or the like allowing light to pass through the transparent layer to allow items located on the layer to be imaged (or in general sensed) from below through the layer.

Experiment is preferably to be considered in broad terms including also repeated experiments and production.

In preferred embodiments according to the first aspect, the robot comprising
- a horizontal or horizontally slanted experiment layer being adapted to support items at arbitrary positions on or in the experiment layer, wherein said experiment layer being transparent and/or comprising one or more openings adapted to receive one or more items or to display the at least a part of the bottom of the item, said openings being either through going the experiment layer or comprising a transparent bottom;
- a moveable sensor arranged below the experimental layer said sensor being configured for providing a sensor signal indicative of item(s)' location on the experiment layer;
- an actuator arranged for being moved into different positions above the horizontal transparent layer;
- a display device being configured for visually representing located item(s);
- a user input device;
- wherein the robot further comprising a processor configured to
  - on the basis of the sensor signal locate an item on the experiment layer;
  - display the located item(s) or a graphical presentation thereof on the display device;
  - receive a manipulation input through the user input device, and
  - in response to said manipulation input, control the actuator to manipulate the content of the displayed item(s).

In some preferred embodiments, the location of an item may comprise determining the relative position in the robot of the item.

In some preferred embodiments, the sensor may further be adapted to determine the content of an item.

In some preferred embodiments, the transparent experiment layer may extend in one horizontal plane.

In some preferred embodiments, the manipulation may comprise exchange content between items supported by the experiment layer.

In some preferred embodiments, the robot may comprise rails and slides arranged below the transparent experiment layer and on which the sensor may be arranged so to move the sensor horizontally in a plane parallel-displaced to the experimental layer.

In some preferred embodiments, the sensor may comprise a camera, such as an digital camera, such as an optical coherence tomography camera, with a field of view covering at least a section of the experimental layer.

In some preferred embodiments, the robot may comprise rails and slides arranged above the transparent experiment layer and on which the actuator may be arranged so to move the actuator horizontally in a plane parallel-displaced to the experimental layer and vertically.

In some preferred embodiments, the robot may comprise a robotic arm on which the actuator may be arranged.

In some preferred embodiments, the actuator may comprise an electronically operated suction and dispensing device, such as a syringe, pipette or the like.

In some preferred embodiments, one or more of the items may be containers, such as petri dish, well-plate or the like.

In some preferred embodiments, one or more of the items may be receptacles having an at least partially transparent bottom and/or a non-transparent marker.

In some preferred embodiments, the robot may further comprise an item dispenser configured for dispensing items onto and/or into the experimental layer.

In some preferred embodiments, the display device and input device together may be a touch sensitive display device.

In some preferred embodiments, the experiment layer may be adapted to support items in the experiment layer by comprising a horizontal or horizontally slanted plate comprising openings adapted to receive items. 15In combination thereto, the size, shape and number of openings in a plate may define a plate pattern so as to allow one plate pattern to be exchanged with another plate with another plate pattern. 16Alternatively or in combination thereto, the plate may comprise one or more openings made in material such as metal, plastic or glass, preferably said plates is produced by moulding.

In some preferred embodiments, the robot may further comprise a protective transparent plate positioned, preferably parallel to and, below the experiment layer, such as below the plate comprising one or more openings.

In some preferred embodiments, the at least one, such as all openings may have a bottom to repose the weight of an item wherein at least the bottom(s) may be transparent to allow the moveable sensor to provide a sensor signal indicative of the items location in the experimental layer.

In a second aspect, the invention relates to a receptacle for use in a robot according to the first aspect. Such a receptacle may preferably be adapted to receive a container and having an open or transparent bottom and/or a non-transparent marker.

In a third aspect, the invention relates to a method of controlling the robot according the first aspect of the invention.

In some preferred embodiments, the method may comprise the steps of:
  obtaining by use of the sensor the location of one or more items, if any present, at the experiment layer,
  displaying on the display device, an image representing the one or more located items,
  receiving manipulation input through the user input device indicative of desired exchange of content between the displayed items,
  controlling the actuator in accordance with the received manipulation input.

In some preferred embodiments of the method, the sensor may be a camera providing a digital image and the step of obtaining the location of one or more items may comprise
  obtaining the field of view used for providing the digital image;
  for at least one item (8), recognising in the digital image a pre-defined pattern representing the item (8) and the pattern's position in the field of view.

In some preferred embodiments of the method, the pre-defined pattern may be a projected contour of an item on the experimental layer.

In some preferred embodiments of the method, the pre-defined pattern may be an object, preferably not resembling the shape of the item, such as bar-code, a QR-code, a polygon, a circle, an ellipse.

In some preferred embodiments of the method the manipulation input may comprise:
  selecting one or more items to obtain a manipulated content
  instructing the robot to provide the manipulated content.

In some preferred embodiments of the method, the step of obtaining the location of one or more items may be repeated a number of time during the time at which a manipulation is carried out and the thereby obtained locations for each item may be compared to identify movements of the items during manipulation.

In some preferred embodiments, the method may further comprise generating an error signal if a movement of an item is identified as being larger than a predefined threshold.

In some preferred embodiments, the method may comprise
  obtaining by use of the sensor for an item a signal representing the content of the item, such as a number of bacteria colonies in a petri dish.

In some preferred embodiments of the method, the obtaining by use of the sensor for an item a signal representing the content of the item may be repeated a plurality of times so as to obtain a plurality of consecutive signals each representing the content of the item at different time instances.

The individual aspects of the present invention may each be combined with any of the other aspects. These and other aspects of the invention will be apparent from the following description with reference to the described embodiments.

BRIEF DESCRIPTION OF THE FIGURES

The present invention and in particular preferred embodiments thereof will now be described in more detail with regard to the accompanying figures. The figures show ways of implementing the present invention and are not to be construed as being limiting to other possible embodiments falling within the scope of the attached claim set. In the figures having a coordinate system shown, the orientation according thereto relates to preferred orientations.

DETAILED DESCRIPTION OF AN EMBODIMENT

Figure 1:
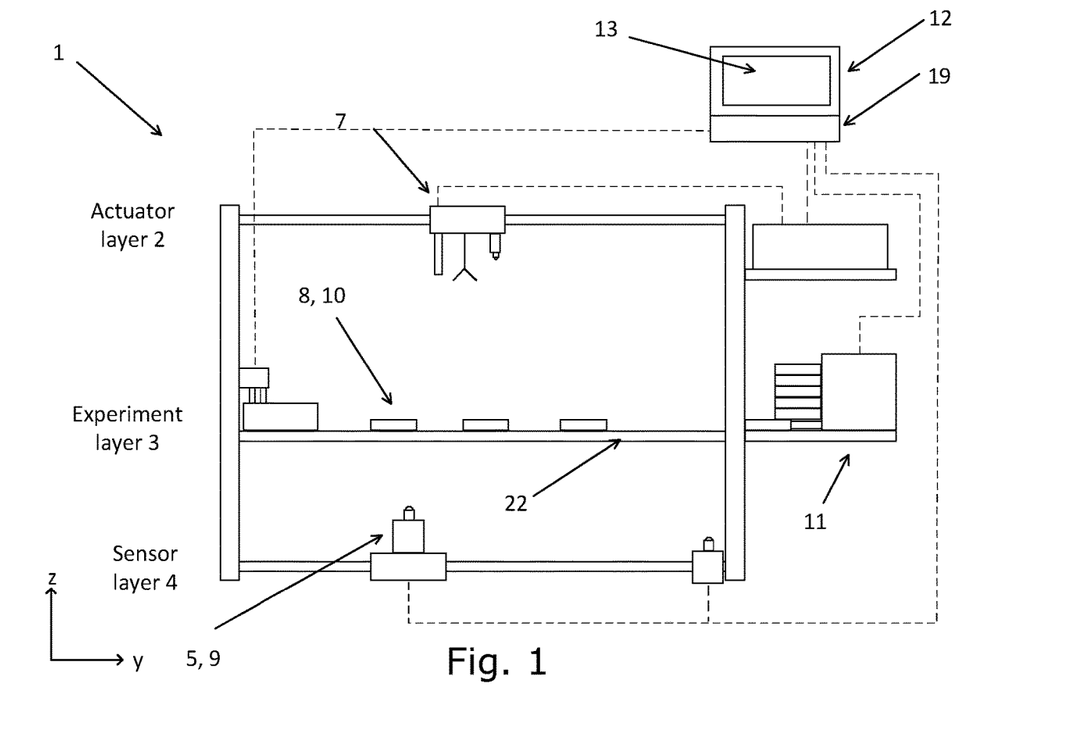
FIG. 1 is a schematic side view of a gantry robot according to a first embodiment of the invention.

Reference is made to FIG. 1 which schematically illustrates a robot according to a first embodiment of the invention. It is noted that the embodiment of FIG. 1 illustrates the robot as being a gantry robot, but the invention is not limited to such gantry robots as will be elucidated below. In the following x,y refers to horizontal coordinates and z refers to vertical coordinates.

As illustrated in FIG. 1, the robot 1 comprises a horizontal transparent experiment layer 3 being adapted to support items 21, 8 at arbitrary positions at the experiment layer 3. In many practical embodiments, the transparent experiment layer 3 is a plate 22 made from a transparent material such glass, plastic or the like allowing light to pass through the transparent layer 3 to allow items 8 located on the layer 3 to be imaged (or in general sensed) from below through the layer 3. In some preferred embodiments, the term "at arbitrary position" refers to that the transparent layer 3 is a straight plate with no cavities/openings or with cavities/openings, indentations or the like for receiving the items 5. Items 8, 21 can either be placed arbitrarily on the surface or by using a fixture be restricted to a fixed pre-determined position.

The robot further comprising a moveable sensor 5 arranged below the transparent experimental layer 3. The sensor 5 is typically arranged so that it can be moved horizontally in an x,y-plane and the sensor 5 is preferably configured for providing a sensor signal indicative of item(s)' 8 location, e.g. the x,y position, at the experiment layer 3.

The robot further comprising an actuator 7 arranged for being moved into different positions above the horizontal transparent layer 3. Typically, the actuator is moveable in all three directions x, y, z of the robot, so as to allow the actuator to e.g. extract a sample from one item 8, and deliver the sample to another item 8 both items being located on the transparent layer 3.

Thus, a characteristic of a robot according to the present invention is that the actuator 7 is located above the transparent layer 3 and the sensor 5 is located below the transparent layer 3.

The sensor 5 is disclosed above as being configured for determining the position of an item 8; however, the sensor 5 may also be configured for determining a content in an item. For instance the sensor 5 may be configured—assisted by suitable software and hardware—to determining e.g. a bacteria colony count in an item 10.

Further, the robot has a display device 12 being configured for visually representing located item(s) 8. This typically means that the sensor 5 determines the position of an item 8 and an image is shown on the display device 12 illustrating the position of the item 8 on the transparent layer 3 and/or the items relative position to another item 8 located on the transparent layer 3 (see also FIG. 3).

In FIG. 1 data connections used e.g. for instructing elements of the robot and/or receiving data from such elements are illustrated by dotted lines. It is noted that the processor(s) 19 used in the control of the robot and the display device is(are) in the embodiment shown in FIG. 1 built into the display device 12 but may be arranged differently.

Instruction of the robot to carry out a manipulation of items 8 and/or content in the items 5 is typically carried out by use of a user input device 13. Preferably, and as illustrated in FIG. 1, the user input is a touch sensitive screen of the display device and the instruction to be carried out by the robot is typically provided by a drag-and-drop (see FIG. 3) action. Alternatively or in combination thereto the input device may be a computer mouse (not shown).

The control of the various functions of the robot is carried out by a processor 19 included in the robot or in a computer connected to the robot, e.g. built into the display device 12 as disclosed above. Such a processor—or computer in general—is typically configured to on the basis of the sensor signal(s) to locate an item 8 on the transparent experiment layer 3, to provide e.g. the x,y-coordinates of an item 8.

After the item is located, the processor 19 produces a graphical representation of the located item(s) on the display device 12.

The processor 19 then receives a manipulation input through the user input device 13, and in response to said manipulation input, controls the actuator 7 to manipulate the content of the displayed item(s) 8.

It is noted that although focus in the above have been put in disclosing the system as being user driven, the robot may operate in a fully automated manner if so desired. This could for instance be implemented by the user input being pre-input as a general instruction to perform a given manipulation with a pre-selected set of items 8 such as containers.

An item's 8 location may be described in different reference systems, and it is generally preferred that the location of an item 8 comprising determining the relative position in the robot. This means for instance the an x-y-coordinate system is assigned with a fixed origo on surface of the transparent experimental layer 3 and a position of an item 8 is referenced within this coordinate system. Further, as an item 8 typically has a horizontal extension, the position of the item may be selected either as a projection of the horizontal extension on the experimental layer 3 (whereby the position may be a set of x,y coordinates parametric representation of the projection) and/or a geometrical centre of the item 8.

As disclosed above the sensor 5 may further be adapted to determine the content of an item 8. This means that the sensor 5 may be comprised by a composite sensor having a number of different sensors 5' for sensing different characteristics and being assembled to form the composite sensor 5. Such different sensors 5' may be thermographic sensors, magnetism sensors, microscope, full view camera, laser scanners, web-cam and/or the like.

Although the invention is not limited to a transparent experiment layer 3 extending in one horizontal plane, this is generally preferred e.g. as items 8 can be moved around on the horizontal plane by a simple push-pull operation. However, if for instance a slanted transparent layer 3 is preferred, the items 8 can be maintained a position on the layer e.g. by use of magnetic force. If the items 8 is not magnetisable, a magnetisable element, such as a sheet of metal, may be applied to the item. If a receptacle 17 is used, this receptacle can be made of metal or other magnetisable material or a magnetisable element, such as a sheet of metal may be applied to the receptacle 17.

The manipulation may comprise a number of different actions and in a preferred embodiment, the manipulation comprising exchange content between items 8 supported by the experiment layer 3. In such embodiments, the actuator 7 may preferably comprising a pump such as an actuated syringe for sucking up liquid from an item 8, and deliver the liquid into another item 8 (if the item is a well plate, the actuator may also deliver to another well in the same item).

In a preferred embodiments as illustrated in FIG. 1, the robot 1 comprising rails 14 (extending horizontally—see FIG. 2) and slides 15 arranged on the rails 14 to provide an x-y-movement; the sensor 5 is arranged on one of the slide 15 and this arrangement is arranged below the transparent experiment layer 3 so as to move the sensor 5 horizontally in a plane parallel-displaced to the experimental layer 3.

In many preferred embodiments, the sensor 5 comprises or is formed by a camera 9, such as a standard web camera, with a field of view covering at least a section of the experimental layer 3. As will be elucidated further below, locating of an item by a camera included determining the position of the item 8 in the field of view of the camera and determining the position of the camera, the latter being determined e.g. by keeping track of the movement of the camera or by a calibration step that provides the position of the camera.

Figure 2:
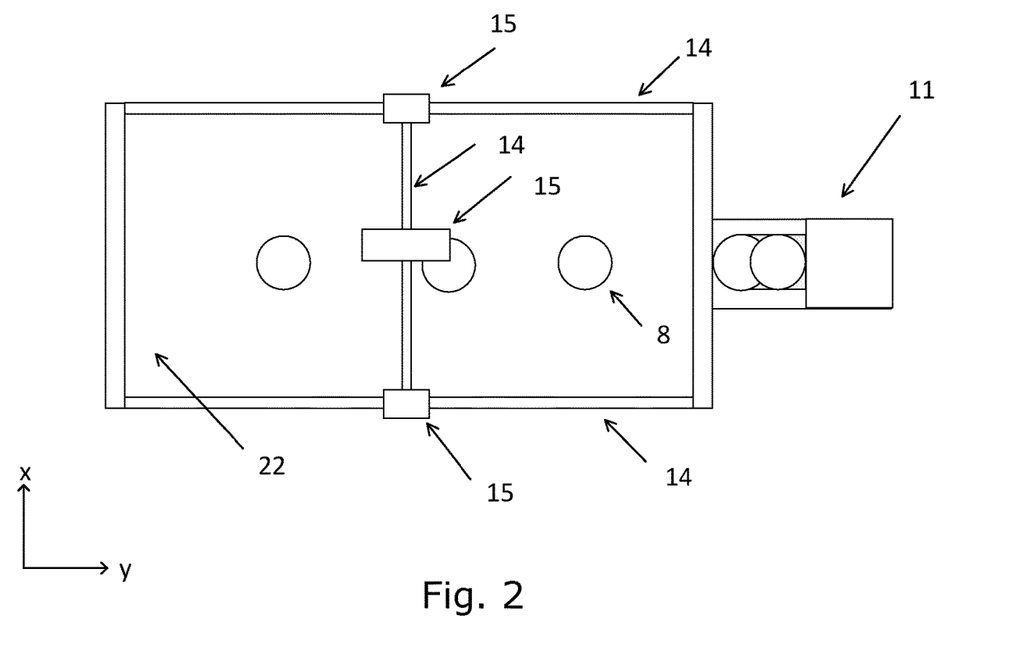
FIG. 2 is a schematic top view of a the gantry robot of FIG. 1.

In embodiments where the robot 1 is in the form of a gantry robot, the robot has rails 14 and slides 15 arranged above the transparent experiment layer 3 as illustrated in FIG. 2. The actuator 5 is arranged on a slide so as to move the actuator 5 horizontally in a plane parallel-displaced to the experimental layer 3 and vertically.

Alternatively to the gantry robot—or in combination thereto—the robot has a robotic arm 6 on which the actuator 7 is arranged. Such a robotic arm 6 is typically a multi axis robotic arm with a pivot position arranged away from the plane defined by the transparent layer 3; that is typically beside extremities of the sensor layer 4 and at the same vertical level as the sensor layer 4.

Common for both the gantry robot and the robotic arm—or a robot in general—is typically, that the actuator 5 may comprise an electronically operated suction or dispensing device, such as a syringe, pipette or the like.

A robot according to the present invention is considered highly versatile as it may handle and manipulate content of item 8 of many different types, and it is has proven to be specially useful for robotic handling of item being containers, such as petri dish, well-plate or the like.

While many such items 8 can be characterised as containers having an at least partially transparent bottom and/or a non-transparent marker 16. Such non-transparent marker 16 may be applied to the item 8 in order to solve visibility issues stemming from a camera having difficulties in locating transparent items and/or may be applied to identify a certain item 8. Such a marker 16 may be in the form of e.g. a bar code or another unique identifier, e.g. a physical element arranged inside and/or outside the item 8.

As illustrated in FIGS. 1 and 2, a robot 1 according to the present invention may further comprise an item dispenser 11 configured for dispensing items onto the experimental layer 3. As illustrated in FIGS. 1 and 2 the item dispenser has a storage for storing a stack of item and a pusher configured to push an item 8 from the stack (typically the lowest item in the stack) and onto the experimental layer 3. If further positioning of an item 8 on the experimental layer is desired, the actuator 8 may be equipped with a device configured for moving the item 8 along around on the experimental layer 3.

Figure 5:
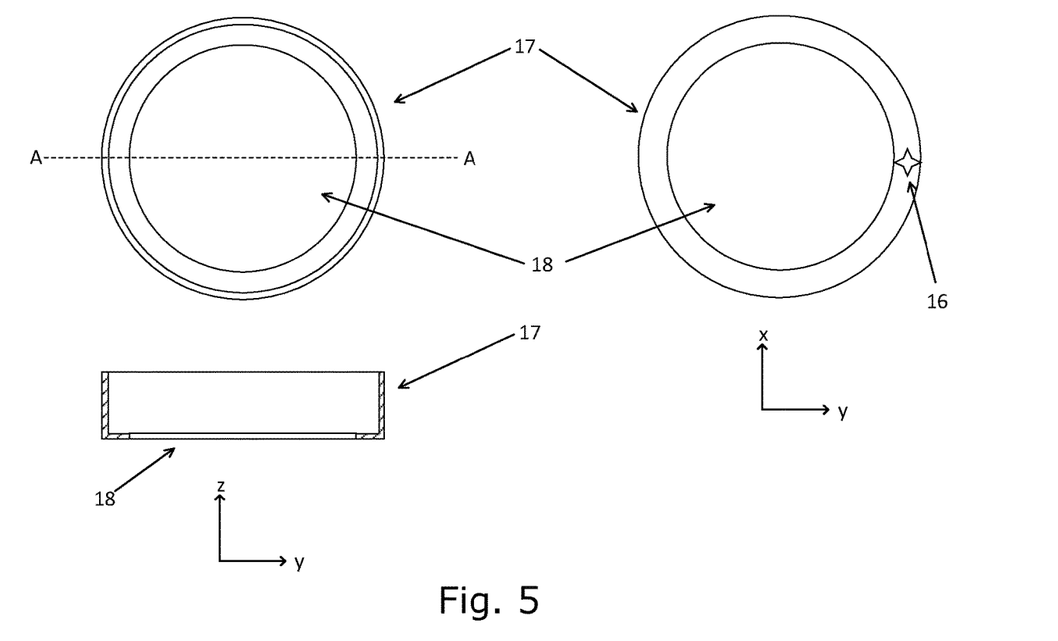
FIG. 5 is a schematic illustration of a receptacle according to a preferred embodiment of the invention.

In some preferred embodiment, the items 8 (or in general container 10) are received in a receptacle 17. Such a receptacle 17 is adapted to receive e.g. a container and has an open or transparent bottom and/or a non-transparent marker 16. This concept is illustrated in FIG. 5. which illustrates in a schematically manner a receptacle 17 having an open bottom 18—or an at least partially transparent bottom part 18. In the upper part of FIG. 5, the receptacle 17 is shown as seen from above and in the lower part of FIG. 5, the receptacle 17 is shown in a cross sectional view along line A-A in the upper part of FIG. 5. The receptacle may be applied with a non-transparent marker 16 as illustrated in right hand side of FIG. 5 illustrating the receptacle as seen from below. In the embodiment shown in FIG. 5, the non-transparent marker is a 4-point star which may be used to indicate the receptacle type or identify the receptacle, which in the latter case often requires that the non-transparent marker is unique for a given receptacle. Other graphical presentations of the non-transparent marker 16, such as bar-codes or the like, can be applied and the actual position on the bottom of the receptacle 17 of the non-transparent marker may be different from what is shown in FIG. 5—for instance the non-transparent marker may be arranged on a transparent bottom of a receptacle.

The invention also relates to a method for controlling a robot 1 according to the present invention. Such a method may typically comprise the steps of:

obtaining by use of the sensor 5 the location of one or more items 8, if any present, at the experiment layer 3,
displaying on the display device 12, an image representing the one or more located items 8,
receiving manipulation input through the user input device 13 indicative of desired exchange of content between the displayed items 8,
controlling the actuator 7 in accordance with the received manipulation input.

The displaying and manipulation input is schematically illustrated in FIG. 1. This figure illustrates a display device imaging two items, a petri dish and a well plate. The manipulation input is illustrated by the "drag and drop" operation where a user e.g points at the petri dish and drags the petri dish onto the well plate. This is translated by the processor 19 of the robot to a manipulation where content of the petri dish is transferred to one of the wells of the well plate.

The sensor is preferably a camera providing a digital image and the step of obtaining the location of one or more items 8 typically comprises obtaining the field of view used for providing the digital image;

for at least one item 8, recognising in the digital image a pre-defined pattern representing the item 8 and the pattern's position in the field of view.

Typically, the pre-defined pattern is a projected contour of an item on the experimental layer 3. Alternatively, or in combination thereto, the pre-defined pattern is or includes an object, preferably not resembling the shape of the item 8, such as bar-code, a QR-code, a polygon, a circle, an ellipse.

In some situation, the manipulation or other externally influences may shift the position of an item during the manipulation and the step of obtaining the location of one or more items 8 may be repeated a number of time during the time at which a manipulation is carried out and the thereby obtained locations for each item 8 are compared to identify movements of the items during manipulation. This can be used to generate an error signal if a movement of an item is identified as being larger than a predefined threshold. If such an error signal is generated, the manipulation may be changed or aborted so as e.g. to assure that the manipulation is carried out as instructed.

While the above disclosure of the method according to the invention focus of the locating of items the method may advantageously also comprise the step of obtaining by use of the sensor 5 for an item 8 a signal representing the content of the item 8, such as a number of bacteria colonies in a petri dish. Thereby the robot can be used both as a manipulation device and as a measuring device in broad terms.

The obtaining by use of the sensor 5 for an item 8 a signal representing the content of the item 8 is repeated a plurality of time so as to obtain a plurality of consecutive signals each representing the content of the item 8 at different time instances. Thereby time series may be obtained representing e.g. a process occurring in an item 8.

Also the actuator 7 may be devised with a sensor for sensing one or more properties in or of items 8 arranged on the experimental layer 3.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Figure 4:
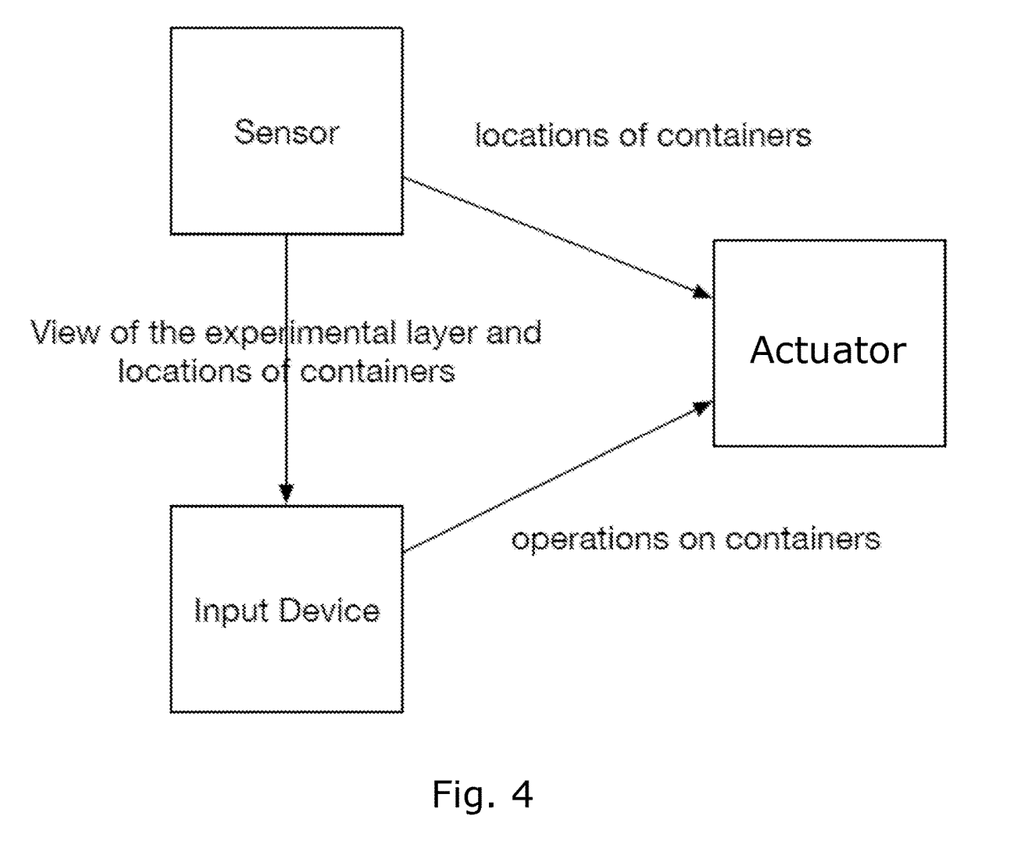
FIG. 4 is a schematic system-chart representing an outline of/in detail the operations of the controlling of the gantry robot according to a preferred embodiment of the invention.

Reference is made FIG. 4 being a flow chart schematically illustrating preferred steps carried out in connection with the present invention. As illustrated in FIG. 4, the sensor 5, provides the location of items—in the embodiment of FIG. 4, the items are containers—on the experimental layer 3. The location is send to the input device and to the actuator.

On the input device, the user is presented with the information provided by or related to the information provided by the sensor, that is typically an image showing the item identified and the items position relative to another item. It is noted if for instance a digital image is obtained, the image shown on the input device may be the digital image but may alternatively be another graphical presentation of the item.

Figure 3:
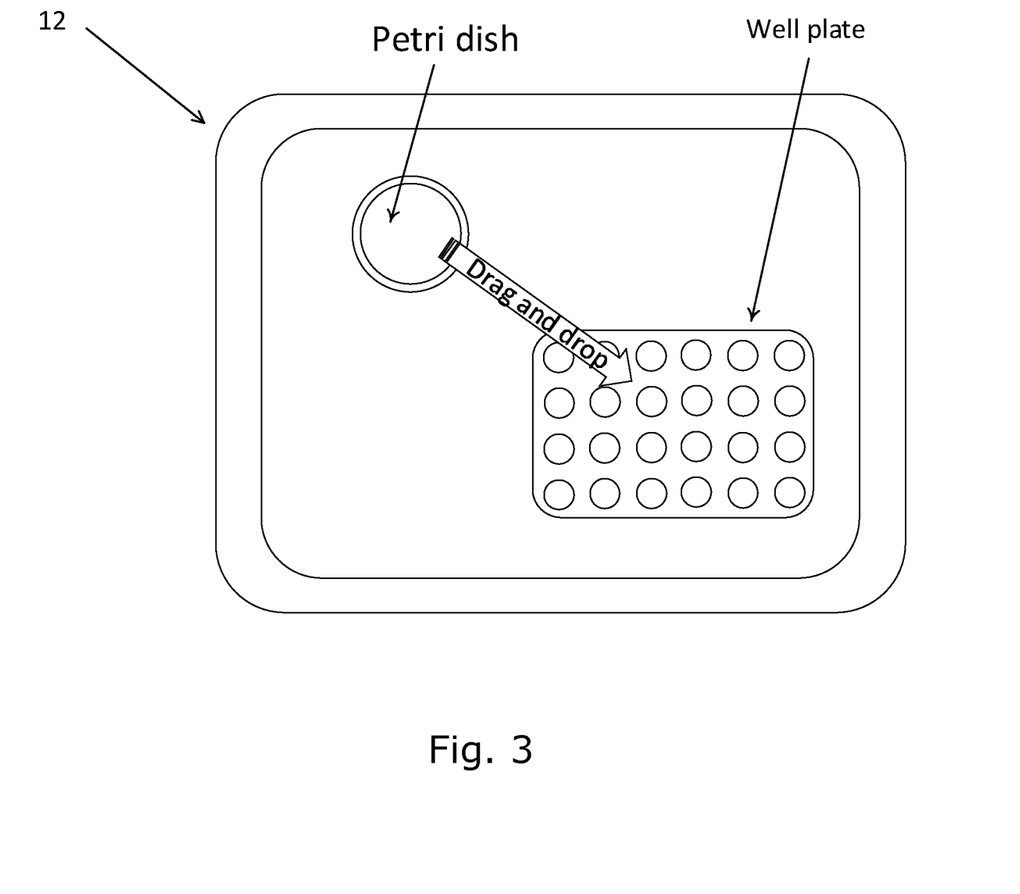
FIG. 3 is a schematic view of a combined display device and input device (touch sensitive device) according to a preferred embodiment of the invention.

The input device is typically as disclosed above, a touch sensitive screen and the user may instruct the robot to carry out operations on the items by a drag-and-drop operation as illustrated in FIG. 3.

In some embodiments of the invention, the experiment layer is adapted to support items 21 on the experiment layer, that is what is disclosed e.g. in FIGS. 1 and 2, wherein the experimental layer is formed by the plate at which the items repose, such as on a horizontal or horizontally slanted transparent plate 22, with or without one or more cavities/openings 20.

The experiment layer 3 may comprise one or more openings 20 adapted to receive one or more items 8, 21 as disclosed below with reference to FIGS. 6 and 7. Alternatively to receiving one or more items 8, 21 in the openings 20, the openings 20 may be smaller than the item allowing the items to repose on the plate 23 so as to display at least a part of the bottom of the item (8, 21) through the opening(s) 20; said openings being either through going the experiment layer 3 or comprising a transparent bottom.

In some embodiments (see FIGS. 6 and 7), the experiment layer is adapted to support items 21 in the experiment layer, such as in a horizontal or horizontally slanted plate 23 comprising openings 20 adapted to receive items 21.

Figure 6:
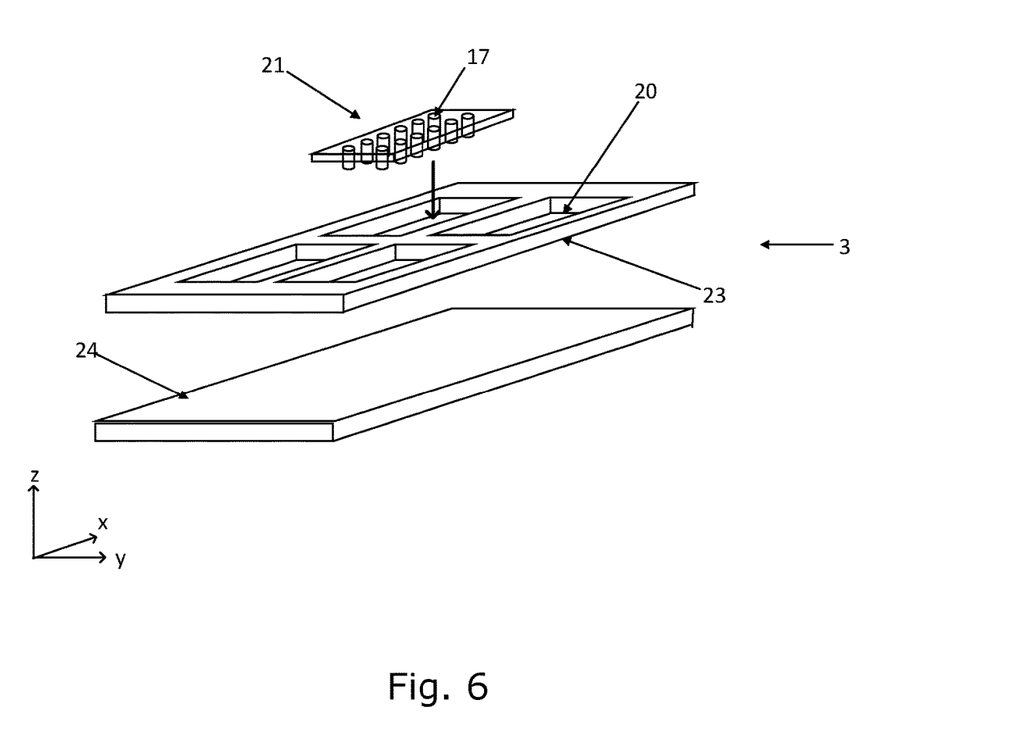
FIG. 6 is a schematic view of an item being placed in an experiment layer and a protective transparent plate that in some embodiments of the invention is arranged below the experiment layer.

Reference is made to FIG. 6, which illustrates an item 21 (In this case a well plate with twelve receptacles) which is about to be positioned (indicated by the vertical arrow pointing towards one of the openings 20) in an experiment layer 3 in a plate 23 comprising four openings 20 for receiving items 21, such as well plates.

The plate may theoretically comprise any number of openings in any desired size and shape, however the most preferred shape are square openings to receive well-plates.

The size, shape and number of openings 20 in a plate 23 define a plate pattern. Different plate patterns can be designed and inserted into the experiment layer 3 so as to allow versatile use of the robot of the invention. More specifically this means, that one plate with one plate pattern can be exchanged with another plate with another plate pattern.

The plate 23 comprising one or more openings 20 can be made in material such as metal, plastic or glass. Preferably, plates with different plate patterns can produced by moulding.

The experimental layer 3 may comprise a protective transparent plate 24 positioned parallel below the plate 23 comprising one or more openings, e.g. to repose the weight of an item and/or protect the moveable sensor located below the transparent plate. FIG. 6 illustrates such a transparent protective plate 24. It is noted that such an protective transparent plate 24 may also be used in case the transparent experiment layer of FIG. 1 is used.

The transparent protective plate 24 and the plate 23 with one or more openings may or may not touch each other. The transparent protective plate 24 and the plate 23 with one or more openings 20 may be merged/fused together, so to form cavities or openings with a bottom.

The openings 20 may have a bottom (not illustrated) to repose the weight of an item 8, 21 and in such embodiments, at least the bottoms are transparent to allow the moveable sensor 5 to provide a sensor signal indicative of the items location in the experimental layer.

Figure 7:
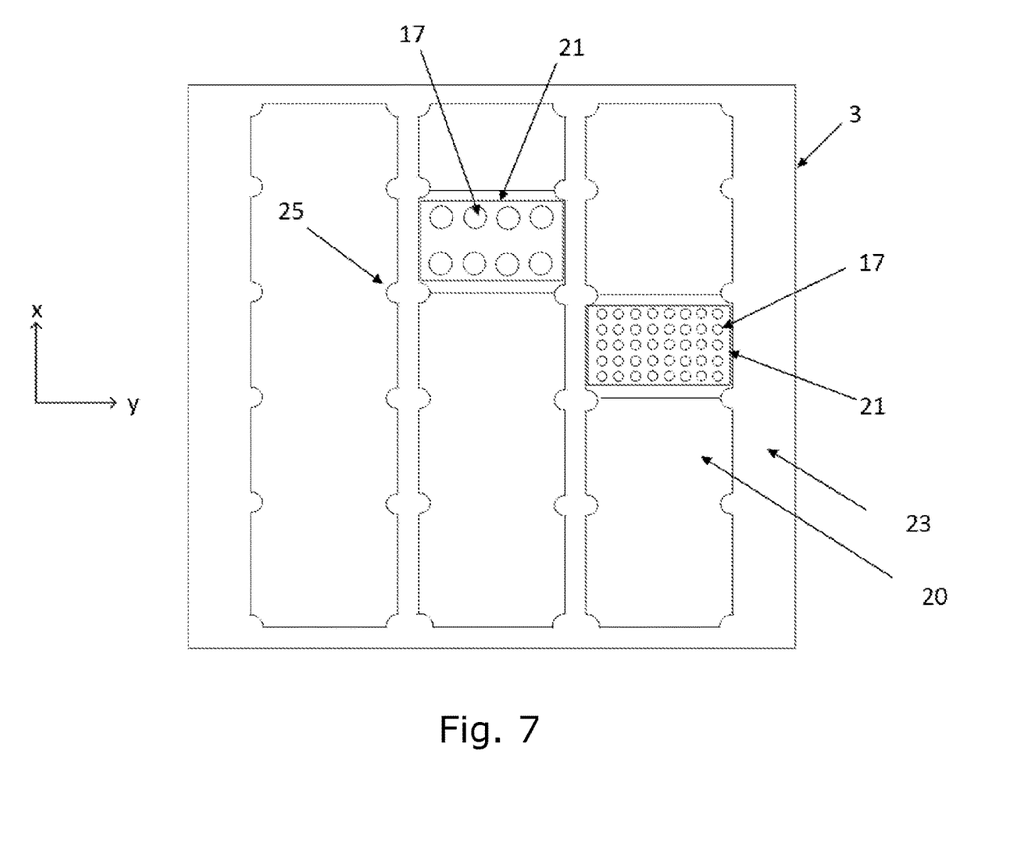
FIG. 7 illustrates an experiment layer comprising openings adapted to support items in the experiment layer.

FIG. 7 is a schematic illustration of an (seen from below) comprising a plate 23 with three openings, separated by protrusions 25 to form fifteen openings 20 configured to receive and support the weight of fifteen items 21, in this case well-plates, wherein two well-plates have been received in the openings 20 at abitrary positions. In FIG. 7, the weight of the two items 21 are supported by semi or quarter circular protrusions 25 in the plate 23, each quarter circular protrusion configured to support one fourth of an items weight. Thus the semicircular protrusions can support one fourth of two different items weights.

The protrusions 25 have to be configured in a way that allows an item 21 to be placed in an opening 20 and repose its weight upon the protrusions 25. The protrusions 25 can be in any form and shape, as long as they support the weight of an item and still allow the moveable sensor 5 to provide a sensor signal indicative of the receptacles 17 location in an item 21.

Using FIG. 7 as a reference, it is apparent that one opening can support more than one item.

In FIG. 7, the items are placed at arbitrary positions and could have been placed in any other opening without any effect on the robot Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Robot
2 Actuator layer
3 Experimental layer
4 Sensor layer
5 Sensor
6 Robotic arm
7 Actuator
8 Item
9 Camera
10 Container
11 Item dispenser
12 Display device
13 User input device
14 Rail
15 slide
16 Non-transparent marker
17 Receptacle
18 Opening in receptacle
19 Processor
20 Opening
21 Item comprising one or more receptacles, such as a well plate
22 Transparent plate
23 Plate comprising one or more opening
24 Optional protective transparent plate
25 Protrusion

The invention claimed is:
1. A robot comprising:
   a horizontal or horizontally slanted experiment layer being adapted to support items at arbitrary positions on or in the experiment layer wherein said experiment layer is transparent or comprises one or more openings configured to receive one or more items to display at least a part of the bottom of the item, said openings either being through the experiment layer or comprising a transparent bottom;

a moveable sensor arranged below the experiment layer said sensor being configured for providing a sensor signal indicative of item(s)' location on the experiment layer;

an actuator arranged for being moved into different positions above the experiment layer;

a display device being configured for visually representing located item(s);

a user input device;

wherein the robot further comprising a processor configured to on the basis of the sensor signal locate an item on the experiment layer;

display the located item(s) or a graphical presentation thereof on the display device;

receive a manipulation input through the user input device, and in response to said manipulation input, control the actuator to manipulate the content of the displayed item(s).

2. The robot according to claim 1, wherein the location of an item comprising determining the relative position in the robot of the item.

3. The robot according to claim 1, wherein the sensor further being adapted to determine the content of an item.

4. The robot according to claim 1, wherein the experiment layer extends in one horizontal plane.

5. The robot according to claim 1, wherein the manipulation comprising exchange content between items supported by the experiment layer.

6. The robot according to claim 1, wherein the robot comprising rails and slides arranged below the experiment layer and on which the sensor is arranged so to move the sensor horizontally in a plane parallel-displaced to the experiment layer.

7. The robot according to claim 1, wherein the sensor comprises a camera with a field of view covering at least a section of the experiment layer.

8. The robot according to claim 1, wherein the robot comprising rails and slides arranged above the experiment layer and on which the actuator is arranged so to move the actuator horizontally in a plane parallel-displaced to the experiment layer and vertically.

9. The robot according to claim 1, wherein the robot comprising a robotic arm on which the actuator is arranged.

10. The robot according to claim 1, wherein the actuator comprising an electronically operated suction and dispensing device.

11. The robot according to claim 1, wherein one or more of the items are containers.

12. The robot according to claim 1, wherein one or more of the items are receptacles having an at least partially transparent bottom and/or a non-transparent marker.

13. The robot according to claim 1, further comprising an item dispenser configured for dispensing items onto the experiment layer.

14. The robot according to claim 1, wherein the display device and input device together is a touch sensitive display device.

15. The robot according to claim 1, further comprising a receptacle being adapted to receive a container and having an open or transparent bottom and/or a non-transparent marker.

16. A method for controlling the robot according to claim 1, the method comprising the steps of:

obtaining by use of the sensor the location of one or more items, if any present, at the experiment layer, displaying on the display device, an image representing the one or more located items, receiving manipulation input through the user input device indicative of desired exchange of content between the displayed items, controlling the actuator in accordance with the received manipulation input.

17. The method according to claim 16, wherein the sensor is a camera providing a digital image and the step of obtaining the location of one or more items comprising obtaining the field of view used for providing the digital image;

for at least one item, recognising in the digital image a pre-defined pattern representing the item and the pattern's position in the field of view.

18. The method according to claim 17, wherein the pre-defined pattern is a projected contour of an item on the experiment layer.

19. The method according to claim 17, wherein the pre-defined pattern is an object, preferably not resembling the shape of the item.

20. The method according to claim 16, wherein the manipulation input comprising:

selecting one or more items to obtain a manipulated content instructing the robot to provide the manipulated content.

21. The method according to claim 16, wherein step of obtaining the location of one or more items is repeated a number of time during the time at which a manipulation is carried out and the thereby obtained locations for each item are compared to identify movements of the items during manipulation.

22. The method according to claim 21, further comprising generating an error signal if a movement of an item is identified as being larger than a predefined threshold.

23. The method according to claim 16, the method comprising obtaining by use of the sensor for an item a signal representing the content of the item.

24. The method according to claim 23, wherein the obtaining by use of the sensor for an item a signal representing the content of the item is repeated a plurality of time so as to obtain a plurality of consecutive signals each representing the content of the item at different time instances.

* * * * *